(12) United States Patent
Lai

(10) Patent No.: US 7,984,372 B2
(45) Date of Patent: Jul. 19, 2011

(54) MARKUP LANGUAGE ELEMENT TO PROVIDE LABEL FOR STORED URI

(75) Inventor: Frederick Chee-Kiong Lai, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1876 days.

(21) Appl. No.: 10/833,170

(22) Filed: Apr. 28, 2004

(65) Prior Publication Data

US 2005/0246626 A1    Nov. 3, 2005

(51) Int. Cl.
    *G06F 15/00*    (2006.01)
(52) U.S. Cl. ...................................... 715/234
(58) Field of Classification Search .......... 715/513, 715/530, 501.1, 854, 760, 205–208, 234
    See application file for complete search history.

(56) References Cited

U.S. PATENT DOCUMENTS

| | | | | |
|---|---|---|---|---|
| 6,466,940 | B1 * | 10/2002 | Mills | 707/102 |
| 6,781,609 | B1 * | 8/2004 | Barker et al. | 715/760 |
| 2002/0116525 | A1 | 8/2002 | Peters et al. | |
| 2002/0196273 | A1 * | 12/2002 | Krause | 345/738 |
| 2002/0197981 | A1 | 12/2002 | Yabe et al. | |
| 2003/0233620 | A1 * | 12/2003 | Vedullapalli et al. | 715/522 |
| 2004/0043758 | A1 | 3/2004 | Sorvari et al. | |
| 2005/0203918 | A1 * | 9/2005 | Holbrook | 707/10 |

FOREIGN PATENT DOCUMENTS

WO    WO 00/79435 A1    12/2000

OTHER PUBLICATIONS

Raggett, Dave, et al., HTML 4.01 Specification, W3C Recommendation, Dec. 24, 1999, pp. 1-389, W3C, http://www.w3.org/TR/1999/REC-html401-19991224.

Tow P et al, "Why not automatically add descriptions to bookmarks via <META> tags?" Jul. 26, 2002. XP002301005 netscape.public.mozilla.wishlist Retrieved from the Internet: URL:http://groups.google.com/groups?th=e2f0a0a7a261abc1.[retrieved on Oct. 15, 2001].

Glazman, Daniel et al: "HTML, CSS, Browsers and Other Exotic Animal Life", Internet Citation, [Online] Apr. 2, 2004-Apr. 5, 2004 pp. 1-2, URL: <http://www.glazman.org/weblog/dotclear/index.php?post/2004/04/02/250-html-css-browsers-and-other-exotic-animal-life.>.

* cited by examiner

Primary Examiner — Cesar B Paula

(57) ABSTRACT

A BOOKMARK element is proposed to be included within the HEAD element of a markup language document. Such a BOOKMARK element is intended to provide a default bookmark label that is to be associated with a Universal Resource Identifier (URI) of a markup language document when storing the URI of the markup language document as a bookmark or favorite. A short, to-the-point label suggested by an author of the markup language document may be seen as beneficial particularly to users of mobile communication devices. Such a suggested label may also greatly improve the user experience of desktop-based browsers.

16 Claims, 2 Drawing Sheets

MARKUP LANGUAGE ELEMENT TO PROVIDE LABEL FOR STORED URI

FIELD OF THE INVENTION

The present invention relates to markup languages and, more particularly, to a markup language element that provides a label for a stored Universal Resource Identifier of a markup language document.

BACKGROUND

The Hyper-Text Markup Language (HTML) and the eXtensible Markup Language (XML), along with several other markup languages, have been developed as universal languages proposed to be used to publish information for global distribution so that all computers may potentially understand the layout of the information.

The World Wide Web Consortium (W3C) oversee the standardization of HTML and has currently recommended HTML version 4.01, the specification of which is available at www.w3.org/TR/REC-html40/cover html on the W3C web site.

According to the specification, an HTML document is composed of three parts: a line containing HTML version information; a declarative header section (delimited by the HEAD element); and a body, which contains the document's actual content. The HEAD element contains information about the current document, such as its title, keywords that may be useful to search engines, and other data that is not considered document content. User agents do not generally render elements that appear in the HEAD as content. They may, however, make information in the HEAD element available to users through other mechanisms. The HEAD element may include a TITLE element to contain a title for the document. Authors are encouraged to use the TITLE element to identify the contents of a document. Since users often consult documents out of context, authors are encouraged to provide context-rich titles. Thus, instead of a title such as "Introduction", which doesn't provide much contextual background, authors are encouraged to supply a title such as "Introduction to Medieval Bee-Keeping" instead.

Elements of a markup language document are delimited by "tags". For instance, the HEAD element type mentioned hereinbefore is delimited by a HEAD element start tag, <head>, and a HEAD element end tag, </head>. Similarly, the TITLE element type mentioned hereinbefore is delimited by a TITLE element beginning tag, <title>, and a TITLE element ending tag, </title>. Notably, some HTML element types allow authors to omit end tags.

According to the W3C HTML specification, elements may have associated properties, called attributes, which may have values (by default, or set by authors or scripts). Attribute/value pairs appear before the final ">" of an element's start tag. Any number of (legal) attribute/value pairs, separated by spaces, may appear in an element's start tag. They may appear in any order.

Additionally, according to the W3C HTML specification, every resource available on the Web—HTML document, image, video clip, program, etc.—has an address that may be encoded by a Universal Resource Identifier, or "URI". URIs typically consist of three pieces: the naming scheme of the mechanism used to access the resource; the name of the machine hosting the resource; and the name of the resource itself, given as a path.

The W3C HTML specification makes reference to "user agents", which are programs used to view HTML documents. These programs are typically called "browsers". Well known browsers include the Microsoft® Internet Explorer and the Netscape® Browser. Each of these browsers includes a mechanism for storing a URI of a given HTML document for later returning to the given HTML document. For instance, in the Microsoft® Internet Explorer, while viewing the given HTML document, a user may select a menu titled "Favorites" and select a menu item named "Add to Favorites". By doing so, the URI of the given HTML document is stored in a "Favorites List". The URI is stored in the Favorites List in association with a label. As such, when the user intends to return to the given HTML document, the user may select the Favorites menu and select a menu item that is the label associated with the URI of the given HTML document. In the Netscape® Browser, a "favorite" is called a "bookmark". Hereinafter, the term bookmark will be used to generically refer to a stored URI of an HTML document in association with a label. When storing a bookmark for an HTML document, browser implementations typically select the value of the TITLE element to use as the label for the bookmark.

Recently, browsers have been implemented in mobile communication devices such as mobile phones and some personal digital assistants (PDAs) that have wireless communication capabilities, along with combinations thereof. The selection of an appropriate label for a bookmark may be seen to be especially important in mobile communication devices for several reasons. It is preferable that a user be able to quickly reference data. In addition, it is preferable that the amount of data entry required on the part of the user be minimized. Finally, it is preferable that data to be viewed on mobile communication devices be easily formatted to fit the small displays typically found on such devices.

The bookmark labels suggested by the TITLE field are often too verbose for use in the browsers found on mobile communication devices and may be considered to be tiresome for use in the browsers found on conventional desktop computers.

Clearly, there is a deficiency in the HTML specification.

SUMMARY

A BOOKMARK element in a given document composed in a markup language (e.g., HTML) indicates a label for use when storing a bookmark for the given document. The label may be provided as a value of an attribute of the BOOKMARK element.

In accordance with an aspect of the present invention there is provided a method of storing a Universal Resource Identifier (URI) of a document composed in a markup language. The method includes storing the URI of the document, thereby creating a stored URI, determining a label based on a value of an attribute of an element of the document and storing the label in association with the stored URI. In other embodiments of the invention, a system for displaying documents is provided for carrying out the method and a computer readable medium is provided for adapting a general purpose computer to carry out the method.

In accordance with another aspect of the present invention there is provided a method of generating a document in a markup language. The method includes providing a label as a value of an attribute of an element of the document, where the label may be stored, in a system for displaying markup language documents, in association with a Universal Resource Identifier (URI) of the document. Additionally, a system for generating a document in a markup language is provided to carry out this method and a computer readable medium is provided for adapting a general purpose computer to carry out the method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
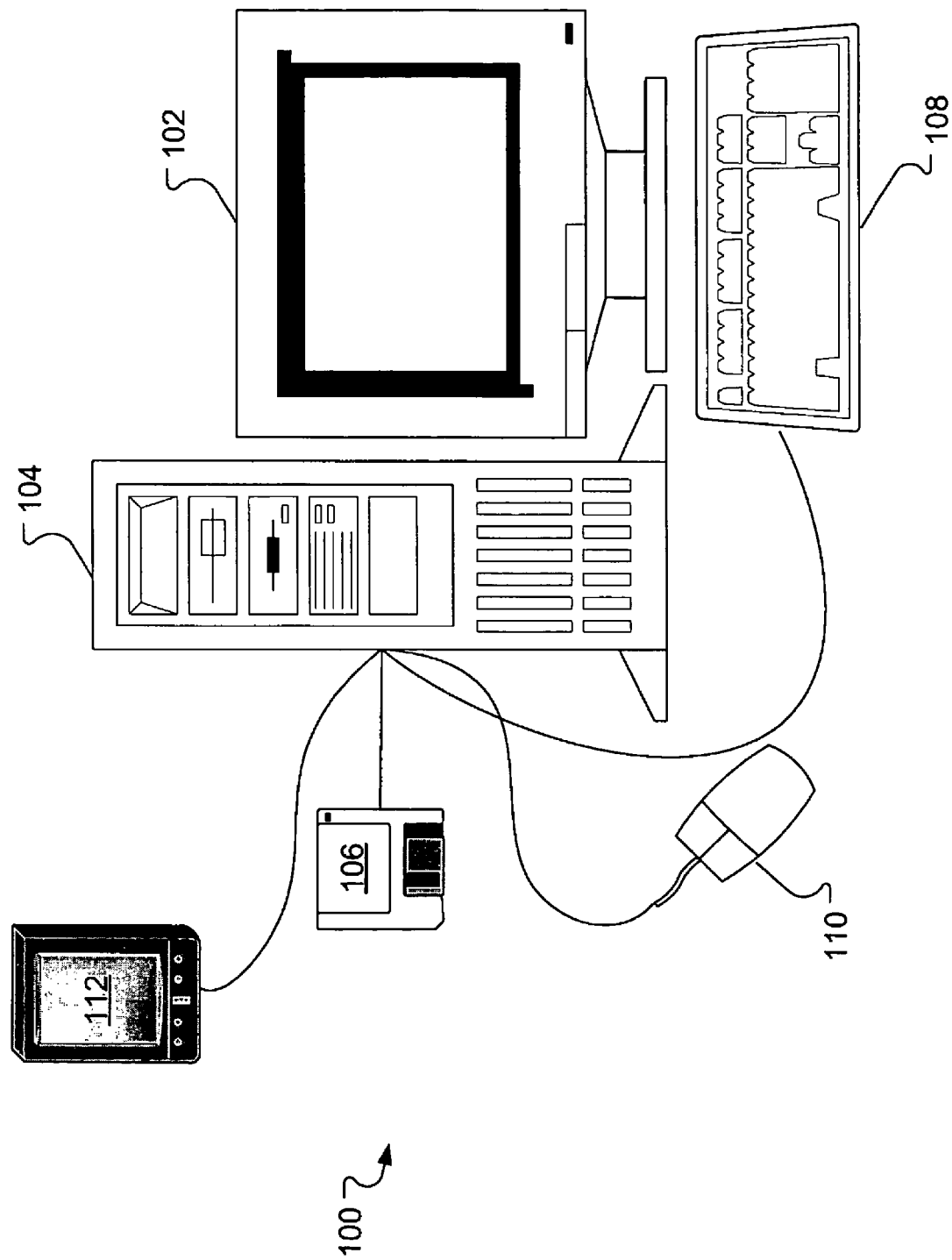
FIG. 1 illustrates a desktop computing system and a mobile communication device, both of which may carry out methods exemplary of embodiments of the present invention.

A desktop computing system 100, which may, at least in part, be considered a system for displaying markup language documents according to methods exemplary of the present invention, is illustrated in FIG. 1. The desktop computing system 100 includes a display monitor 102 and a central processing unit 104. The central processing unit 104 may include hardware to communicate with other computers (over local and/or wide area networks), long term and short term memory and a processor. As is typical, connected to the central processing unit 104 may be multiple input peripherals such as a keyboard 108 and a mouse 110. The desktop computing system 100 may be loaded with a computer readable instruction for executing methods exemplary of this invention from a software medium 106 which could be a disk, a tape, a chip or a random access memory containing a file downloaded from a remote source.

Also connected to the desktop computing system 100 is a mobile communication device 112. The mobile communication device 112 may also, at least in part, be considered a system for displaying markup language documents according to methods exemplary of the present invention. The manner in which the mobile communication device 112 connects to the desktop computing system 100 may be wired, e.g., Universal Serial Bus (USB), Firewire (IEEE 1394), serial cable, or wireless, e.g., Infrared, BlueTooth™, IEEE 802.11. Through connection with the desktop computing system 100 or other source, the mobile communication device 112 may be loaded with computer readable instructions for executing methods exemplary of this invention from the software medium 106 which could be a disk, a tape, a chip or a random access memory containing a file downloaded from a remote source.

As will be clear to a person skilled in the art, the mobile communication device 112 may take the form of a standalone wireless communication device. That is, a wireless device that can browse the World Wide Web (or other mark-up language document networks, such as intranets) without the help of a desktop computer. Wireless devices exemplary of such a system communicate directly with the Internet via mobile wireless networks using protocols such as Code Division Multiple Access (CDMA), General Packet Radio Service (GPRS), Integrated Digital Enhanced Network (IDEN), Mobitex and DataTAC. Further exemplary wireless devices may use the IEEE 802.11 protocol or the wireless communication protocol known as the Universal Mobile Telecommunications System (UMTS). Thus, in terms of browsing the World Wide Web, the exemplary wireless devices provide functionality similar to that of a full desktop system, but on a smaller scale.

In overview, since keeping track of bookmarks is a ubiquitous concept in browsers used in systems for displaying markup language documents, a BOOKMARK element is proposed to be included within the HEAD element of a markup language document. Such a BOOKMARK element is intended to provide a default bookmark label that is to be associated with a URI of a given markup language document when storing the URI of the given markup language document as a bookmark. A short, to-the-point label suggested by an author of the given markup language document, perhaps typically about 20 characters, but not to exceed 64 characters, in length, may be seen as beneficial particularly to users of mobile communication devices. Such a suggested label may also greatly improve the user experience of desktop-based browsers.

In particular, it is suggested that the BOOKMARK element be described by a single BOOKMARK element tag <bookmark>.

Using standard HTML syntax to specify the proposed BOOKMARK element, the BOOKMARK element may be generically expressed as:

```
<bookmark
label="<label string>"
shortlabel="<short label>"
desc="<description to accompany the bookmark>"
folder="<folder string>"
icon="<URI to file containing an image>"
>
```

As may be determined from a review of the generically expressed BOOKMARK element for an associated markup language document, the BOOKMARK element may include attributes such as "label", "shortlabel", "desc", "folder" and "icon".

The label attribute may be used to provide a full-length label for a bookmark to the associated markup language document. The label attribute is not intended to be restricted in length. It is, however, intended that a browser support at least 64 characters for displaying the value of this attribute.

The shortlabel attribute may be used to provide an abbreviated version of the label attribute, that is, an abbreviated label for a bookmark to the associated markup language document. The shortlabel attribute is not intended to be restricted in length. It is, however, intended that a browser support at least 32 characters for displaying the value of this attribute.

The desc attribute may be used to provide description that is to accompany a bookmark to the associated markup language document. The desc attribute is not intended to be restricted in length. It is, however, recommended that the value of the desc attribute not exceed 256 characters. It is intended that a browser support at least 32 characters for displaying the value of this attribute.

The folder attribute is may be used to provide a recommended subfolder in which to store a bookmark to the associated markup language document. The value of this attribute preferably adheres to Microsoft® Windows and UNIX® folder character restrictions that are applicable when naming folders. It is known that folder levels are generally delimited by either a "/" or "\" or a combination of both and that folders may be considered abstract or literal.

The icon attribute may be used to provide a URI for an image or icon to accompany a bookmark for the associated markup language document. Although the image may be of any size, it is generally recommended that the image be 16 pixels by 16 pixels and use no more than 16 colors. The value of the icon attribute is a URI referencing a file containing the image. Although it should be apparent to a person skilled in the art that converting the image to a rendering suitable for display in the browser in association with the bookmark is subject to the browser implementation, clearly, before storing the rendering of the image in association with the bookmark, the browsers must obtain the file containing the image from a machine hosting the file containing the image, where a name for the hosting machine may be determined from the URI.

The following is an exemplary HEAD element of an HTML document. The exemplary HEAD element has been composed to include an exemplary BOOKMARK element according to aspects of the present invention.

```
<html><head>
<title>My Yahoo!</title>
<meta http-equiv="pics-label" content=' (pics-1.1
"http://www.icra.org/ratingsv02.html" l gen true for
"http://my.yahoo.com" r ( nz 0 vz 0 lz 0 oz 0 ca 1))'>
<link rel="shortcut icon" href="/favicon.ico" type="image/x-
icon">
<style type="text/css">
<bookmark
label="My Yahoo! Your very own Yahoo page"
shortlabel="My Yahoo!"
desc="Your personalized Yahoo! Where you go to catch up on
current events"
folder="Yahoo/MyYahoo"
icon="http://us.i1.yimg.com/us.yimg.com/i/bookmarkIcon.gif">
</head>
(portions of the above are Copyright © 2004 Yahoo! Inc.)
```

It is proposed that, in a browser running on the desktop computing system 100 of FIG. 1, the value of the label attribute of the exemplary BOOKMARK element may be associated with the bookmark such that the bookmark list shows the bookmark as: "My Yahoo! Your very own Yahoo page". Additionally, the value of the desc attribute of the exemplary BOOKMARK element may be associated with the bookmark such that, if the properties of the bookmark are requested by the user, the properties are be returned as: "Your personalized Yahoo! Where you go to catch up on current events". Wherever the bookmarks are kept on the system, the bookmark may be placed, according to the value of the folder attribute of the exemplary BOOKMARK element, in an abstract or literal folder called "MyYahoo", which may be understood to reside inside an abstract or literal folder called "Yahoo". In the list of bookmarks, a small icon, pointed to by the URI "http://us.i1.yimg.com/us.yimg.com/i/bookmarkIcon.gif", may appear beside the bookmark label, based on the value of the icon attribute of the exemplary BOOKMARK element.

It is proposed that, in a browser running on the mobile communication device 112 of FIG. 1, the value of the shortlabel attribute of the exemplary BOOKMARK element may be associated with the bookmark such that the bookmark list shows the bookmark as: "MyYahoo!". Additionally, the value of the desc attribute of the exemplary BOOKMARK element may be associated with the bookmark such that, if the properties of the bookmark are requested by the user, the properties are returned as: "Your personalized Yahoo! Where you go to catch up on current events". Wherever the bookmarks are kept on the system, the bookmark may be placed, according to the value of the folder attribute of the exemplary BOOKMARK element, in an abstract or literal folder called "MyYahoo", which may be understood to reside inside an abstract or literal folder called "Yahoo". In the list of bookmarks, a small icon, pointed to by the URI "http://us.i1.yimg.com/us.yimg.com/i/bookmarkIcon.gif", may appear beside the bookmark label, based on the value of the icon attribute of the exemplary BOOKMARK element.

Figure 2:
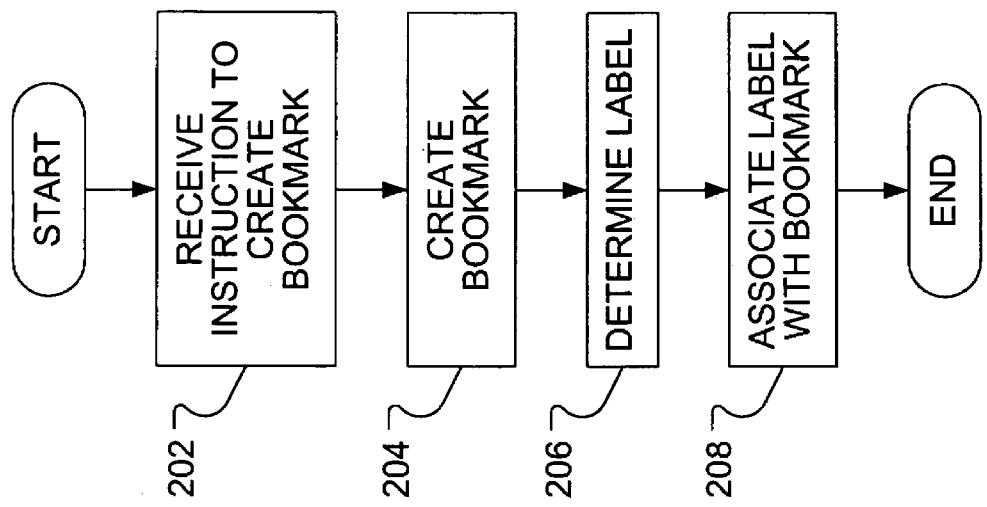
FIG. 2 illustrates steps in a method of storing a URI of a markup language document according to an embodiment of the present invention.

Steps in a method of creating a bookmark are illustrated in FIG. 2. Initially, an instruction is received to create a bookmark for a given document (step 202). According to standard procedures beyond the scope of the present application, a bookmark is created (step 204). A label for the bookmark is then determined from the document (step 206). It is known to determine the label for a bookmark the from the value of the TITLE element. However, if the document has been composed according to aspects of the present invention, then the HEAD element includes a BOOKMARK element, the BOOKMARK element may include a label attribute and a shortlabel attribute and the label for the bookmark may be determined as the value of the label attribute or the value of the shortlabel attribute. Whichever value is determined for the label, the determined label is then associated with the bookmark (step 208).

The determination of the value of the label (step 206) may require that the application (e.g., a browser) implementing the method select between the value of the label attribute and the value of the shortlabel attribute. Such a determination may be made in accordance with the scale of the machine running the application. For instance, the application may select the value of the label attribute of the application is running on the desktop computing system 100 or may select the value of the shortlabel attribute of the application is running on the mobile communication device 112 (FIG. 1). Alternatively, the application may select between the label and shortlabel attributes based upon predetermined user preferences.

As will be familiar to users of browsers, a record of documents viewed is often maintained for future reference. In the Microsoft® Internet Explorer browser, such a record of documents viewed is called a "History". A reference (e.g., a URI) to a viewed document in such a record is typically automatically stored in association with a label having the value of the TITLE element, as is the typical case when storing a bookmark. An application (e.g., a browser) implementing aspects of the method of the present invention may store a label determined as the value of the label attribute or the value of the shortlabel attribute in association with a record of a viewed document.

As will be apparent to a person skilled in the art, the desktop computing system 100 may, at least in part, be considered a system for generating a document in a markup language according to methods exemplary of the present invention. Such systems are known to create such documents based on a layout edited by a user who may have no knowledge of the markup language. Alternatively, the documents may be automatically generated. Such a system employing methods exemplary of the present invention may be adapted to create a BOOKMARK element in which is provided a label as a value of the label attribute of the BOOKMARK element and/or the shortlabel attribute. The label may later be associated, in a system for displaying markup language documents, with a bookmark for the document.

Advantageously, the value of the label attribute may provide a composer of a markup language document with an opportunity to provide a bookmark label that is more succinct than a document title, yet still manages to uniquely identify the contents of the document to a user that wishes to return to view the document at a later time. Furthermore, the composer has an opportunity to provide an abbreviated version of the bookmark label that may be particularly appreciated by those using mobile communication devices to return to view the document at a later time.

Other modifications will be apparent to those skilled in the art and, therefore, the invention is defined in the claims.

I claim:

1. A method of storing a Universal Resource Identifier (URI) of a document composed in a markup language, said method comprising:
   storing said URI of said document, thereby creating a stored URI;
   determining a label based on selecting between a value of a first attribute of an element of said document and a value of a second attribute of said element; and
   storing said label in association with said stored URI.

2. The method of claim 1 wherein said markup language is the Hyper-Text Markup Language.

3. The method of claim 2 wherein said element is a first element and said first element is included in the HEAD element of said document.

4. The method of claim 3 further comprising receiving an instruction to store said URI of said document.

5. The method of claim 1 wherein said markup language is the eXtensible Markup Language.

6. The method of claim 1 further comprising:
   determining a description of said document based on a value of a third attribute of said element; and
   storing said description in association with said stored URI.

7. The method of claim 1 wherein said storing further comprises:
   determining a folder name based on a value of a third attribute of said element of said document; and
   storing said stored URI in a folder having said folder name.

8. The method of claim 1 further comprising:
   determining a Universal Resource Identifier of a file containing an image based on a value of a third attribute of said element of said document;
   obtaining said file containing said image from a machine hosting said image, where a name for said machine may be determined from said URI; and
   storing a rendering of said image in association with said stored URI.

9. The method of claim 1 wherein said second attribute of said element represents a character string no more than half a length of said first attribute.

10. A system for displaying documents composed in a markup language, said system comprising a processor that, upon execution of computer-executable instructions, adapts said system to:
    store said URI of said document, thereby creating a stored URI;
    determine a label based on selecting between a value of a first attribute of an element of said document and a value of a second attribute of said element; and
    store said label in association with said stored URI.

11. A computer readable medium containing computer-executable instructions that, when performed by processor in a system for displaying documents composed in a markup language, cause said processor to:
    store said URI of said markup language document thereby creating a stored URI;
    determine a label based on selecting between a value of a first attribute of an element of said document and a value of a second attribute of said element; and
    store said label in association with said stored URI.

12. A method of generating a document in a markup language, said method comprising:
    providing a first label as a value of a first attribute of an element of said document; and
    providing a second label as a value of a second attribute of said element,
    said first label and said second label for use by a system for displaying markup language documents capable of selecting one of said first label and said second label for storage in association with a Universal Resource Identifier of said document.

13. The method of claim 12 wherein said second label is an abbreviated version of said first label.

14. A system for generating a document in a markup language, said system comprising a processor that, upon execution of computer-executable instructions, adapts said system to:
    provide a first label as a value of a first attribute of an element of said document; and
    provide a second label as a value of a second attribute of said element;
    where one of said first label and said second label may be stored, in a system for displaying markup language documents, in association with a stored Universal Resource Identifier of said document.

15. A computer readable medium containing computer-executable instructions that, when performed by processor in a system for generating a document in a markup language, cause said processor to:
    provide a first label as a value of a first attribute of an element of said document; and
    provide a second label as a value of a second attribute of said element
    said first label and said second label for use by a system for displaying markup language documents capable of selecting one of said first label and said second label for storage in association with a stored Universal Resource Identifier of said document.

16. A method of storing a Universal Resource Identifier (URI) of a document composed in a markup language, said method comprising:
    storing said URI of said document, thereby creating a stored URI;
    determining a value for a first attribute of an element of said document;
    determining a value for a second attribute of said element;
    selecting a candidate label value as either said value of said first attribute or said value of said second attribute; and
    storing said candidate label value in association with said stored URI.

* * * * *

UNITED STATES PATENT AND TRADEMARK OFFICE
CERTIFICATE OF CORRECTION

PATENT NO. : 7,984,372 B2
APPLICATION NO. : 10/833170
DATED : July 19, 2011
INVENTOR(S) : Frederick Chee-Kiong Lai It is certified that error appears in the above-identified patent and that said Letters Patent is hereby corrected as shown below:

Column 8,
Lines 42-46, "said first label and said second label for use by a system for displaying markup language documents capable of selecting one of said first label and said second label for storage in association with a stored Universal Resource Identifier of said document."

should be changed to

-- ; where one of said first label and said second label may be stored, in a system for displaying markup language documents, in association with a stored Universal Resource Identifier of said document. --

Signed and Sealed this
Twenty-eighth Day of August, 2012

David J. Kappos
*Director of the United States Patent and Trademark Office*